Jan. 11, 1955
W. W. WEINRICH
2,699,363
METHOD FOR ELEVATING GRANULAR MATERIAL
Filed June 17, 1950
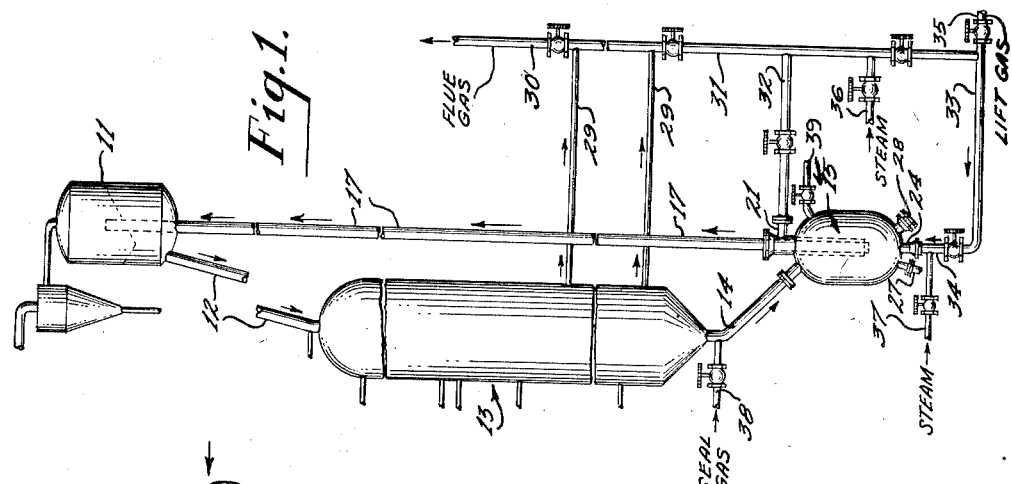
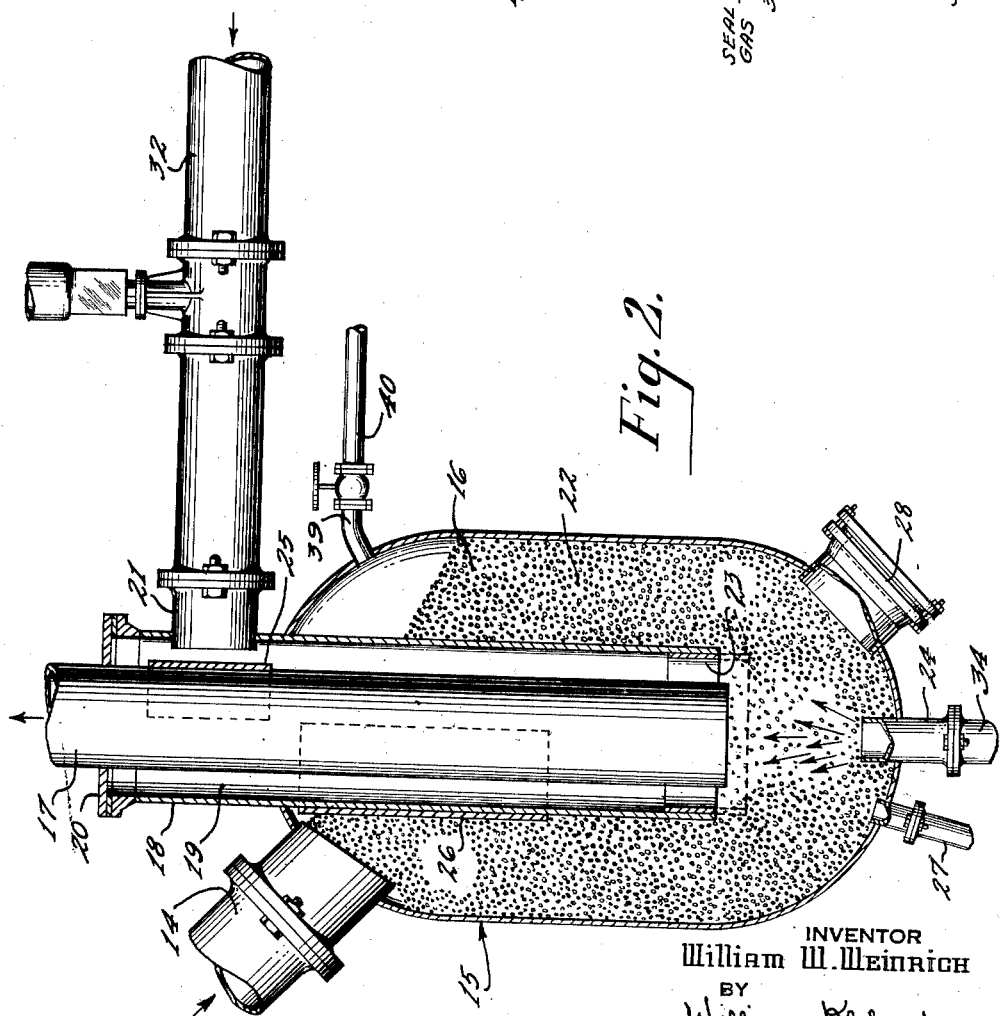
INVENTOR
William W. Weinrich
BY
William Klabunde
ATTORNEY

2,699,363

METHOD FOR ELEVATING GRANULAR MATERIAL

William W. Weinrich, Wallingford, Pa., assignor to Houdry Process Corporation, Wilmington, Del., a corporation of Delaware Application June 17, 1950, Serial No. 168,818

6 Claims. (Cl. 302—17)

This invention relates to a method for elevating granular solid material by suspension in a rising gaseous stream or gas lift, and is particularly adapted for use in systems commonly employed in the chemical processing and oil refining industries wherein particulate solid material is passed through one or more processing or contacting zones in a cyclic procedure, the granular solid material functioning, for example, as a catalyst or as a contact material for other desirable purposes.

The invention is especially applicable to systems involving the catalytic conversion of petroleum, and for the purpose of illustrating the invention in one of its preferred applications it will be hereinafter described in connection with a catalytic cracking system for the conversion of hydrocarbons in the production of motor gasoline in which the solid material is of a catalytic nature and is employed in the form of relatively large aggregates or agglomerated masses, such as pellets, beads, course granules or the like having a particle size in the range between 0.05 and 0.5 of an inch, or having, for example, an average particle size in the order of 14 mesh or larger.

In conversion systems employing catalyst in the abovementioned size range, the catalyst is commonly withdrawn from an elevated source of supply and passed downwardly by gravity flow in the form of a compact moving bed through one or more treating zones wherein the catalyst may be contacted with the hydrocarbons under suitable conditions to carry out the desired reaction, or wherein the catalyst itself may be treated, as in a regenerator or kiln, to condition it for further use. The gravitating catalyst withdrawn from the lowermost treating zone is then reelevated to the source of supply and recycled through the system.

Various methods and means for returning the catalyst to its elevated source of supply are well known, a typical method being the mechanical conveyance of the material upwardly in a conveyor comprising an endless chain of buckets which pick up the catalyst from a lower hopper and elevate it to the source. A typical system involving the gravitational feed of granular catalyst as a moving non-turbulent bed through contact zones, and the subsequent elevation of the catalyst material from its point of discharge to its initial elevated position by means of mechanical elevating means, is discussed generally in an article entitled "The T. C. C. Catalytic Cracking Process for Motor Gasoline Production" by R. H. Newton, G. S. Dunham and T. P. Simpson, recorded in the "Transactions of the American Institute of Chemical Engineers," volume 41, page 215, April 25, 1945, and in other articles therein cited.

It has further been proposed to overcome the various disadvantages inherent in mechanical lifts operating through relatively long vertical distances, such as those required in oil refinery installations, by substituting pneumatic lifts. In a typical pneumatic lift, solid catalytic particles withdrawn by gravity flow from the lowermost treating or contact zone are introduced into an engaging zone in which they are picked up by or injected into a gaseous stream and conveyed upwardly by suspension therein through a vertical lift pipe to an elevated separating zone. The solid particles are separated from the gas stream within the latter zone and are then passed downwardly again through the various treating zones in a cyclic procedure. The invention will hereinafter be described particularly in connection with the latter type of system, a fuller description of which is given in an article entitled "Houdriflow: New Design in Catalytic Cracking" appearing at page 78 of the January 13, 1949, issue of the "Oil and Gas Journal." The article illustrates a design comprising superimposed circular reactor and regenerator sections through which the catalyst in the form of beads or pellets is passed by gravity flow. The catalyst is supplied to the system from an upper lift hopper disposed at an elevation substantially above the combined reactor and regenerator section and, after discharging from the latter, the catalyst is passed downwardly into a lower lift hopper. The lower lift hopper includes an engaging zone in which the catalyst is introduced into a stream of gas, such as flue gas, air, steam, etc. and conveyed thereby upwardly through a lift pipe to the upper lift hopper, which includes a disengaging zone for separating the catalyst from the lift gas.

In the operation of systems involving a cyclic flow of contact material, it is usually necessary to provide means for carefully controlling the solids circulation rate. When the system includes a gas lift for elevating the contact material after it has completed the downflow portion of its cycle, such control of the circulation rate is most readily obtained by process control elements associated with the lift proper, and particularly with the lower lift hopper, or engaging zone.

It is known in the art that solids may be elevated through a gas lift by providing an introduction chamber to confine the solids into a compact gravitating bed, submerging the lower end of the lift pipe in the bed, and introducing lift gas into the introduction chamber as a confined annular stream discharging downwardly about the lower periphery of the lift pipe. The gas stream engages the solids in the zone immediately surrounding the mouth of the lift pipe and carries them laterally under and upwardly into the same, the rate of solids flow into and through the lift being dependent upon the amount of lift gas so introduced.

It has been found, however, that lift operation is extremely sensitive to the flow of relatively minor quantities of additional gas in a direction concurrent to the lateral flow of solids toward the mouth of the lift pipe, that is, to a crossflow of gas from the bed laterally under the end of the lift pipe. Such is the case whether the additional gas is introduced at the top of the bed or at some intermediate point in the path of continuous solids flow toward the lift inlet. For example, a relatively small amount of additional gas so introduced produces a substantial increase in the solids flow rate. By varying the amount of cross-flow gas, a sensitive process control of the solids flow rate, or circulation rate in the case of a cyclic system, is obtained. In accordance with the present invention, a method is provided for introducing regulated amounts of such laterally moving or cross-flow gas in order to control the solids flow rate.

In a copending application, Serial No. 128,363, filed in the name of John W. Delaplaine on March 1, 1950, there is disclosed a lift system in which the major or primary portion of the total lift gas is introduced to the engaging zone through a confined annular path defined by that portion of the lift pipe which extends within the introduction chamber and a radially spaced sleeve concentrically surrounding the same, and is discharged immediately adjacent the lower periphery of the lift pipe. A minor or secondary portion of the total lift gas is introduced into the bed of solids in the lower region of the introduction chamber below the level of the lift pipe inlet. Preferably, though not necessarily, such secondary stream of lift gas is directed axially upward into the mouth of the lift from an inlet beneath the end of the lift pipe, the two being vertically separated by a gap of sufficient size to permit the formation of a static layer of solids immediately above the secondary gas inlet. By static layer is meant a clearly defined layer or zone within the bed which is relatively static compared to the movement of solids from portions of the bed around the end of the lift pipe laterally into the lift path, and which retains its identity as such, without substantial lateral movement although particles of the solid material may continuously pass upwardly out of the static layer into the stream of primary gas and entrained solids entering the mouth of the lift pipe, and be replaced by solids from the moving bed. The stream of secondary gas diffuses upwardly through the so-called static layer and through regulation of its flow, provides a process control for the flow of solids into and through the lift pipe. The control thus obtained extends the range of control which may be obtained through regulation of the sleeve height alone. The solids flow rate is thus controllable through a relatively wide range of values without adjustment of the sleeve height subsequent to its initial setting, and without necessarily varying the total amount of lift gas introduced into the engaging zone. For a given total quantity of lift gas, control of the solids flow rate may be obtained by dividing the total flow of lift gas between the primary and secondary streams, that is, between the annular sleeve passage and the diffuser inlet, and then varying the proportion of diffuser gas flow with respect to the primary gas flow. In any case, the diffuser gas constitutes a minor portion of the total gas, for example, up to about 35% of the total volume, but not sufficient in quantity to alone elevate the solids. The diffuser gas may be similar in kind to that supplied in the primary stream or it may be any other suitable gaseous medium. For example, the primary stream of lift gas may comprise a mixture of flue gases and the secondary stream may comprise steam or other inert gas.

The present invention is applicable to both the aforementioned systems, that is, to systems in which all the lift gas is introduced in a confined stream discharging adjacent the lower periphery of the lift pipe, and to systems in which the major portion of the total lift gas is so introduced and a minor portion thereof introduced as diffuser gas into the lower region of the bed below the mouth of the lift pipe.

In accordance with the present invention, improved control of the solids flow rate, beyond that which may be obtained through control of total gas flow by adjustment of the sleeve height, and; when using primary and secondary gas, through control of the latter, may be obtained by passing relatively small amounts of gas in a cross-flow or lateral direction under the lower end of the lift pipe. Preferably, such cross-flow gas flows with the solids through at least a substantial portion of the bed, and enters the lift path along its entire lower perimeter. Cross-flow gas may be introduced near the lower end of the lift pipe, or at some higher level within the bed, or it may be introduced into the free space above the moving bed. In applying the invention to a system employing a primary stream discharging downwardly about the lower end of the lift pipe and a secondary stream diffusing upwardly through the relatively static layer of solids below the lift inlet, the cross-flow gas and the diffuser gas combine to make a flow of process control gas available throughout the entire interface between the moving stream of solids flowing into the mouth of the lift and the relatively static layer of solids below the lift inlet. The combined streams, however, comprise a minor portion of the total lift gas; and, preferably, the amount of cross-flow gas is not more than about 15–20 percent of the total lift gas.

If the lift hopper and the chamber supplying solids thereto are at different pressures, gas will flow through the connecting seal leg. Gas flowing down the seal leg will act as part of the cross-flow gas. If gas flows up the seal leg, it may be supplied to the lift hopper in addition to the desired quantity of cross-flow gas. If desired, seal gas may be added to the seal leg in known manner, but such addition is not considered suitable for lift control purposes. It is contemplated that if desired the addition of cross-flow gas may be sufficiently in excess of lift requirements to provide sealing gas for the seal leg, or it may be in such quantity as to satisfy lift requirements when supplemented by the sealing gas flowing into the hopper from the seal leg.

For a fuller understanding of the invention, reference may be had to the following description and claims taken in connection with the accompanying drawing forming a part of this application in which:

Fig. 1 is a schematic view in elevation showing a typical hydrocarbon conversion system embodying a gas lift for the circulation of solid contact material to which the present invention is applicable; and Fig. 2 is an enlarged elevation in view of the lower lift hopper in partial section showing the flow directing elements and control instruments suitable for carrying out the invention.

Referring to the drawing, the invention is illustrated in connection with a typical catalytic cracking system for the conversion of hydrocarbons, such as that disclosed in the aforementioned article appearing in the "Oil and Gas Journal." Without any limitation on its application to systems in general employing a gas lift for circulating solid contact material, the invention will hereinafter be described in connection with the continuous circulation of catalyst in the form of granules or pellets.

In Fig. 1 of the drawing, granular catalyst is continuously withdrawn from the bottom or an upper lift hopper, designated by the numeral 11, and is passed by force of gravity downwardly through a seal leg 12 to the upper end of a combined reactor-regenerator or reactor-kiln, generally indicated by the numeral 13. In passing through the reactor-regenerator 13 the catalyst, gravitating as a compact moving bed, may pass successively through a zone in which the catalyst is contacted with hydrocarbon vapors under conditions effective to produce the desired conversion, a zone in which the gaseous products of conversion are separated from the catalyst, which has become contaminated by a deposit of coke thereon, a zone in which the carbonaceous deposit is removed from the catalyst, as by combustion in a kiln, and a zone in which the catalyst is separated from waste products of regeneration, such as the gaseous products of combustion.

Regardless of the particular procedure or type of treatment along the downward path, the reactivated or regenerated catalyst is withdrawn from the bottom of the reactor-regenerator 13 into a seal leg 14, through which it passes downwardly to a lower lift hopper 15 comprising a confined engaging zone 16 wherein the catalyst is picked up by a gaseous stream and conveyed upwardly through a vertical lift pipe 17 to the upper lift hopper 11.

Referring also to Fig. 2, the lower end of the lift pipe 17 is positioned centrally within the engaging zone 16 and passes through a concentric sleeve 18 extending from a point above the hopper 15 downwardly through the upper end of the hopper to a point adjacent the lower end of the lift pipe 17. The sleeve member 18 is suitably secured, as by welding, within an opening formed in the upper end of the hopper. The annular space 19 formed between the lift pipe 17 and the sleeve 18 is sealed at the upper end by an annular cover plate 20, attached to the outer wall of the lift pipe. Cover plate 20 may be removably secured in any conventional manner to the upper end of the sleeve, in order to facilitate dismantling of the apparatus for the purposes of inspection or repair. Sleeve 18 is provided with an inlet 21 through which a gaseous lift medium, such as flue gas, steam, or air, may be introduced to the engaging zone by passing downwardly through the annular space 19, inwardly under the lower edge of the lift pipe 17, and then upwardly through the lift pipe to a disengaging zone within the upper lift hopper 11.

The lift pipe 17 and its associated sleeve 18 terminate within the engaging zone 16 at points low enough to provide a region in which catalyst introduced in the upper region of the engaging zone through seal leg 14 may form a compact moving bed 22 of substantial depth. The moving bed 22 passes downwardly by gravity flow through the annular portion of zone 16 between the hopper wall and the sleeve 18 to the lower region of the engaging zone, below the lower ends of the sleeve and the lift pipe.

A sleeve extension or liner 23 is removably attached in any convenient manner to the lower end of sleeve 18, so that the vertical distance, arbitrarily called the sleeve height, between the lower end of the lift pipe 17 and the lower end of the sleeve 18 may be varied. It has been found that, within reasonable limits, the catalyst circulation rate may be varied by changing the sleeve height, and that, for any position of the sleeve extension 23, there is a limited range of variation in catalyst circulation rate which may be obtained by variations in the total amount of lift gas introduced into the engaging zone. The extension is therefore preferably initially set in accordance with predetermined lift requirements, and subsequent changes in the catalyst circulation rate are effected through other means, such as by controlling the introduction of gas into the engaging zone.

It will be noted from inspection of the drawing that the granular material or catalyst introduced through seal leg 14 into the upper region of the engaging zone 16 passes downwardly as a moving bed out of contact with any of the lift gas until it reaches the lower end of the sleeve 18, or its extension 23. At this point it moves inwardly toward the center of the chamber, merging with the gas stream discharging downwardly from the annular space 19 and being conveyed thereby upwardly into and through the lift.

While the preferred method of introducing lift gas to the engaging zone is downwardly in an annular stream surrounding the entire portion of the lift pipe 17 contained within the chamber 15, it should be apparent that other means of gas introduction are possible within the scope of the invention. A possible modification, for example, is to introduce lift gas through a distributing means encircling the lift pipe at its lower end, the gas being supplied to the distributing means in a confined stream passing laterally through the side wall of the hopper. It is apparent that such modification would permit an operation substantially identical to that provided by the construction shown in Fig. 1, in that the stream of lift gas could be discharged from the distributing means uniformly downwardly around the lower end of the lift pipe. It is also contemplated that, in a proper case, the lift conduit may be to one side of the engaging zone, instead of being centrally positioned therein, in which event an operation in accordance with the present invention may be carried out by introducing the gas as a downwardly discharging stream horizontally coextensive with that portion of the lift wall under which the mixture of gas and catalyst must pass in entering the lift path.

In the bottom wall of the hopper or chamber 15 an inlet 24, in axial alinement with the lift pipe 17, is provided for the introduction of a secondary stream of lift gas. The inner end of inlet 24 is spaced from the lower end of the lift pipe 17, so that gas discharging upwardly from the inlet may diffuse through the mixture of catalyst and lift gas immediately above, the gap therebetween being set to provide the desired flow characteristics of the catalyst entering the mouth of the lift pipe. If desired, the inlet 24 may be longitudinally adjustable, so that the distance between the end of the inlet 27 and the end of the lift pipe 17, arbitrarily called the gap, may be varied at will to control the operation of the lift.

The usual provisions for protecting the apparatus from erosion by impingement of the incoming gas or catalyst streams may be provided in the form of wear plate 25, secured to the outer surface of the lift pipe 17 opposite the gas inlet 21, and wear plate 26, secured to the outer surface of sleeve 18 opposite the discharge end of the seal leg 14.

Catalyst may be removed from the lower lift hopper through drain 27 provided in the bottom wall of the chamber 15, and access may be had to the interior of the chamber formed by hopper 15 through the usual covered manhole 28.

In operating the lift in accordance with the present invention, there is no limitation as to the kind of lift gas employed. This is true for both the primary stream of gas introduced through inlet 21 and the secondary stream of gas introduced through inlet 24. Each inlet may introduce the same kind of gas or they may introduce different gaseous materials. While flue gas, steam, and air have earlier been suggested for this purpose, it is to be understood that gaseous hydrocarbons or other gaseous reactants may be employed as the lift medium dependent upon the type of system in which the lift is employed. The piping arrangement illustrated in Fig. 1 is designed to permit the use of either flue gas from the regenerator section of vessel 13 or of any other suitable gas. For example, a portion of the flue gas discharging from vessel 13 through conduits 29 into the stack 30 may be withdrawn from the lower end of the stack through conduit 31 and passed to the lower lift hopper 15. An upper branch conduit 32 connects conduit 31 with sleeve inlet 21, and a lower branch conduit 33 and its continuation 34 connect conduit 31 with diffuser inlet 24. Lift gas may be conveyed through conduit 35 from another source, not shown, and introduced into conduit 33. Provision is also made for the introduction of steam into conduit 31 through conduit 36, and into conduit 34 through conduit 37. Valves of suitable type, diagrammatically shown in Fig. 1, are provided to regulate in known manner the flow of gas into and through the various conduits. By suitable adjustment of the valves, the same gas or different gases may be introduced into the lift hopper 15 through sleeve inlet 21 and diffuser inlet 24. Or, if desired, a mixture of gases from the various sources may be introduced into either or both inlets.

In known manner, seal gas may be introduced into seal leg 14, as by conduit 38, to prevent any migration of incompatible gases between adjacent zones or vessels. For example, if hydrocarbon gases are employed as a lifting medium and regenerated catalyst is passed downwardly through seal leg 14 from the kiln portion of vessel 13 to the hopper 15, an inert seal gas would be required in line 14 when vessel 13 is at a higher pressure than hopper 15 to prevent migration of oxygen-containing gas to hopper 15. Such seal gas as may enter the lower lift hopper with the incoming granular material will of course pass downwardly in the moving bed 22 and eventually merge with the primary gas stream, or with the mixture of primary and secondary gases in the event that diffusing gas is also employed, the seal gas in such cases supplements to a very minor extent the supply of gases in the engaging zone available for lift purposes.

In the event that hopper 15 is at a higher pressure than vessel 13 when hydrocarbon vapors are being employed, as the lifting medium, inert seal gas may be introduced to seal leg 14 near its lower end, not shown, in such quantity that hydrocarbon vapors are prevented from flowing upward through seal leg 14. Alternatively, an inert cross-flow gas may be chosen for addition through line 39, which gas will also prevent hydrocarbon vapors from migrating upward through seal leg 14.

An inlet 39 at the upper end of hopper 15, communicates with the free space in the upper region of the engaging zone above the level of the moving bed of solids 22. Gas supplied through conduit 40 from a source, not shown, is introduced through inlet 39 into the upper region of the hopper or engaging zone. The gas so introduced flows concurrently with the granular material down the outside of the sleeve to the lift pipe inlet. Such additional gas provides a cross-flow below the lower end of the sleeve inwardly toward the axis of the lift pipe, which tends to facilitate or speed up the engagement between the solid particles and the main stream of lift gas. The result is an increase in solids flow rate and in lift pressure drop. Decrease in the quantity of cross-flow gas produces the opposite effect. When sealing gas enters the hopper through conduit 14 such gas of course mixes in the moving bed with the cross-flow gas entering through inlet 39 and together they constitute the cross-flow supply. As previously stated, a portion of the gas admitted through inlet 39 may be diverted for sealing purposes in conduit 14.

The addition of cross-flow gas below the lift pipe in accordance with the present invention therefore provides a process means for controlling lift operation, just as did the addition of diffusing gas from below the lift inlet, disclosed in the aforementioned copending application Serial No. 128,363.

It is thus possible to control solids flow in the lift by control of the amount of cross-flow gas passing concurrently with the solids downwardly outside the sleeve and laterally inward toward the mouth of the lift pipe.

The effect of cross-flow air on lift operation may be illustrated by reference to the following examples of lift performance under representative operating conditions in both a 3-inch and a 13-inch lift pipe, using air as the gaseous lift medium. Two cases for each lift have been considered. In Case I, each example assumes a condition in which the pressure at the top of seal leg 14 is lower than the pressure within the introduction chamber 15, and Case II assumes the reverse condition. The first case, therefore, requires the passage of seal gas upwardly through the seal leg. Such seal gas may, if desired, be supplied through the inlet 39 along with the gas intended for cross-flow purposes. In the second case, there is a constant flow of seal gas into the introduction chamber from seal leg 14 which subsequently becomes cross-flow gas, thus supplementing the gas introduced through inlet 39 for that purpose.

*Example I*

| | | |
|---|---|---|
| Lift pipe diameter (17) | in | 3.0 |
| Average depth-catalyst bed (22) | ft | 4.0 |
| Annulus area-catalyst bed (22) | sq. ft | 0.554 |
| Sleeve height | in | +0.5 |
| Air rate to sleeve (18) | SCFM | 120 |
| Air rate to diffuser (24) | SCFM | 30 |

Case I

| Cross Flow Air | | Catalyst Flow Rate (lb./sq. ft./sec.) |
|---|---|---|
| SCFM | Percent of Total Air | |
| 0 | ------ | 60.0 |
| 10 | 6.25 | 83.0 |
| 20 | 11.8 | 121.0 |

Case II

| 11.8 | 7.29 | 88.5 |
|---|---|---|
| 16.1 | 9.69 | 101.0 |
| 25.3 | 14.4 | 145.0 |

*Example II*

| Lift pipe diameter (17) | in | 13.0 |
|---|---|---|
| Average depth-catalyst bed (22) | ft | 8.0 |
| Annulus area-catalyst bed (22) | sq. ft | 1.94 |
| Sleeve height | in | —3.0 |
| Air rate to sleeve (18) | SCFM | 900 |
| Air rate to diffuser (24) | SCMF | 310 |

Case I

| Cross Flow Air | | Catalyst Flow Rate (lbs./sq. ft./sec.) |
|---|---|---|
| SCFM | Percent of Total Air | |
| 0 | ------ | 52.0 |
| 50 | 3.97 | 66.0 |
| 100 | 7.63 | 78.5 |

Case II

| 46 | 3.66 | 64.5 |
|---|---|---|
| 67 | 5.25 | 69.0 |

The foregoing examples clearly show the marked effect upon the solids flow rate that may be obtained by flowing relatively small percentages of the total lift gas laterally under the lift inlet and concurrently to the flow of solids. In the case of a 3-inch diameter lift pipe, a cross-flow of about 6 percent of the total gas produced almost a 50 percent increase in the solids flow rate; and in the case of a 13-inch diameter lift pipe, a 12 percent cross-flow doubled the solids flow rate.

It is apparent that the present invention introduces an additional process control means for gas lift operation, which may be used either in conjunction with or in place of diffuser process control disclosed in the aforementioned copending applications. While, in certain cases, it may be preferred to operate with cross-flow gas instead of diffuser gas, the extended range of flexibility or control afforded by their joint use makes the latter arrangement preferable in most cases. Although the effects of adding equal increments of cross-flow gas and diffuser gas are quite similar, it has been found that the solids flow, or catalyst circulation, is somewhat more sensitive to changes in the cross-flow gas rate than to similar changes in the diffuser gas rate.

From the foregoing it is apparent that by regulation of the cross-flow of gas laterally through the gap between the discharge point of the primary gas stream at the lower end of the lift pipe and the upper end of the diffuser inlet, as herein described, an effective control upon the operation of the gas lift may be obtained. Thus, relatively small increases in cross-flow gas inwardly toward the lift produce a relatively large increase in the solids flow rate; and, conversely, decreases in cross-flow gas decrease the solids flow rate.

It is to be understood that the gas introduction through inlet 39 preferably supplements the diffuser gas introduced through inlet 24, thereby increasing the range of control, and that the total amount of gas so introduced, even when supplemented by sealing gas from seal leg 14, constitutes a minor portion of the total lift gas.

Since both the rate of diffuser gas introduction through inlet 24 and the rate of cross-flow gas introduction through inlet 39 provide process controls for varying the circulation rate of the granular material in the system of Fig. 1, it is obvious that lift operation may be controlled by maintaining a constant flow rate through either one and varying the flow rate through the other. In either case, the concomitant use of diffuser gas and cross-flow gas provides a gas flow toward the lift inlet over the entire surface or interface, however sharply defined, between the mass of solid particles actually entrained in the lift stream and the mass of solid particles which may be considered as part of the moving bed.

The control of cross-flow of gas through the gap between the lower end of the lift pipe, as extended by its sleeve, and the upper end of the diffuser inlet, as herein described, provides an effective control upon the operation of the gas lift. Thus, relatively small increases in cross-flow gas inwardly toward the lift produce a relatively large increase in the solids flow rate; and, conversely, decreases in cross-flow gas decrease the solids flow rate. Although the cross-flow of gas may be effected either by the addition or the withdrawal of gas through the conduits 39 and 40, it is preferred to obtain the desired control by varying the amount of gas addition therethrough.

While the invention has been shown in but one form, it is obvious that various changes and modifications thereof may be made within the spirit of the invention. It is contemplated, for example, that the introduction of cross-flow gas may be made at a point or points within the engaging zone, above or below the surface of the moving bed, other than that illustrated in the drawing. Furthermore, the invention is not limited to a single lift pipe in its application, but may be applied with equal advantage to a multiple lift system, that is, one in which the solid contact material is elevated from a common hopper through a group of parallel lift paths.

What I claim is:

1. A method for continuously and uniformly elevating granular material through an upright confined lift path by means of lift gas, which comprises the steps of: continuously passing said granular material downwardly as a compact moving bed within a confined zone containing the lower end portion of said lift path; forming within the portion of said bed surrounding and below the inlet to said confined lift path a space free of compacted granular material bounded at its bottom and sides by an internal exposed surface of said compact bed formed by the inward movement of said bed as it flows below the lower end of said confined lift path; introducing a major portion of said lift gas into said confined zone as an annular stream discharging downwardly about and immediately adjacent to the lower perimeter of said confined lift path and flowing inwardly through an annular gap maintained between said lower perimeter and said internal exposed surface, said major portion of the lift gas being made to flow through said gap at a velocity sufficient to entrain particles of granular material from said exposed surface and to convey the same into and upwardly through said confined lift path; introducing an independently controlled minor portion of said lift gas directly into said compact moving bed in at least one region spaced from the region of engagement between said granular material and said major portion of the lift gas, said minor portion alone being insufficient in amount to effect the elevation of said granular material into said lift path and, at least in part, being caused to flow concurrently with that portion of said bed which is laterally adjacent to said exposed surface and whose movement is predominantly laterally inward toward the extended axis of said confined lift path, thereby more readily effecting engagement between said granular material and said major portion of the lift gas; and continuously replenishing only the amount of said granular material withdrawn from said bed by introducing a confined compact moving stream of said granular material into said confined zone at a location spaced a substantial distance above said lift path inlet and at rate determined by and equal to the rate of elevation of said granular material through said lift path, thereby maintaining a constant bed level and a continuous compact flow of granular material from said replenishing stream onto said bed, said rate of elevation being responsive to variations in the flow of said concurrently flowing minor portion of the lift gas.

2. A method as defined in claim 1, in which said part of said minor portion of lift gas is introduced into the upper end of said zone above said moving bed, and passes concurrently with said granular material to the inlet and said lift path.

3. A method as defined in claim 1, including the step of introducing an additional part of said minor portion of lift gas into the lower region of said moving bed at a level substantially below said internal exposed surface of granular material.

4. A method as defined in claim 3, wherein said additional part of said minor portion of lift gas is introduced into a relatively-static layer of granular material sufficiently remote from said annular gap to be substantially free of the impelling influence of said major portion of the lift gas, thereby providing a well-diffused flow of said additional part of said minor portion of lift gas through said relatively-static layer into the more rapidly moving stream of solids impelled by said major portion of lift gas.

5. A method as defined in claim 1, including the step of adding an additional part of said minor portion of lift gas as seal gas accompanying said granular material into said zone.

6. A method as defined in claim 1, in which said minor portion of said lift gas comprises up to about 15% of the total lift gas.

References Cited in the file of this patent

UNITED STATES PATENTS

| | | |
|---|---|---|
| 528,417 | Duckham | Oct. 30, 1894 |
| 1,498,630 | Jensen | June 24, 1924 |
| 1,549,285 | Baker | Aug. 11, 1925 |
| 2,493,911 | Brandt | Jan. 10, 1950 |

FOREIGN PATENTS

| | | |
|---|---|---|
| 180,397 | Great Britain | May 11, 1922 |
| 7,075 | Holland | June 15, 1922 |
| 268,667 | Great Britain | Apr. 7, 1927 |